United States Patent [19]

Elson

[11] Patent Number: 5,538,398
[45] Date of Patent: Jul. 23, 1996

[54] HAND OPERATED BICYCLE PUMP

[76] Inventor: Robert J. Elson, 601 Bryson Ave., Palo Alto, Calif. 94306

[21] Appl. No.: 243,275

[22] Filed: May 16, 1994

[51] Int. Cl.$^6$ .................................................. F04B 21/04
[52] U.S. Cl. ............................ 417/53; 417/234; 417/526; 137/540
[58] Field of Search ........................ 417/465, 483, 417/526, 527, 231, 234, 53; 137/540

[56] References Cited

U.S. PATENT DOCUMENTS

| | | | |
|---|---|---|---|
| 510,036 | 12/1893 | Lowth | 417/231 X |
| 799,786 | 9/1905 | Freel | 417/231 |
| 827,714 | 8/1906 | Dible | 417/526 |
| 1,280,511 | 10/1918 | Macbeth | 417/234 X |
| 1,491,388 | 4/1924 | Foster | 417/526 X |
| 3,819,302 | 6/1974 | Ohashi | 417/234 |
| 4,120,614 | 10/1978 | Bouder | 417/63 |
| 4,334,839 | 6/1982 | Flagg | 417/536 |
| 4,569,275 | 2/1986 | Brunet | 92/58.1 |
| 4,712,592 | 12/1987 | Brown | 141/98 |
| 4,932,849 | 6/1990 | Scheffer | 417/568 |
| 5,026,261 | 6/1991 | Jou | 417/555.1 |
| 5,051,073 | 9/1991 | Newbold | 417/526 |
| 5,127,804 | 7/1992 | Chappell | 417/231 |
| 5,137,430 | 8/1992 | Alioto | 417/231 |
| 5,165,876 | 11/1992 | Wang | 417/511 |
| 5,318,317 | 1/1994 | Hopper | 417/231 |

FOREIGN PATENT DOCUMENTS

| | | | |
|---|---|---|---|
| 333778 | 10/1958 | Switzerland | 417/526 |
| 696168 | 8/1953 | United Kingdom | 417/526 |

OTHER PUBLICATIONS

Performance Bicycle Shop [catalog], p. 61, mid-summer 1993.

Primary Examiner—Richard E. Gluck
Attorney, Agent, or Firm—Lyon & Lyon

[57] ABSTRACT

The disclosed manually operated bicycle pump is portable on the frame of a bicycle and need not be detached from the bicycle frame when in use. The disclosed pump transfers substantially the same volume of air to a pneumatic tube or tire on both inward and outward strokes and preferably employs a more efficient double u-cup seal structure in the piston head assembly. In addition, the disclosed pump preferably employs a more efficient and easily manufacturable flex value structure to seal or open an air inlet port. The disclosed pump design allows the body of the pump to be anchored such that the user is free to use a more efficient set of human musculature to operate the pump.

3 Claims, 10 Drawing Sheets

HAND OPERATED BICYCLE PUMP

FIELD OF INVENTION

The present invention relates to manually operated pumps, in particular, manually operated bicycle pumps.

BACKGROUND

Pumps are generally useful whenever the transfer of gas or liquid is desired. Manually operated pumps are often more convenient for transferring gases or liquids at remote sites than motorized pumps due to their relatively lighter overall weight and better portability. Manually operated pumps are especially useful for inflating pneumatic tires or inner tubes of bicycles with a gas such as air.

Generally, manually operated bicycle pumps of the prior art provide compressed air by moving a piston longitudinally within a cylinder (i.e. a stroke) to thereby pressurize the air within the cylinder. The pressurized air may then be transferred from the cylinder to a receiving tube or tire via a valve. The volume of air compressed per stroke of the piston is generally a function of the diameters of the piston and the cylinder, as well as the length of the cylinder.

These prior art pumps typically comprise a cylindrical body, a piston, and a piston rod. The piston is typically positioned in the cylindrical body and connected to the piston rod which is also typically positioned within the cylinder. The piston rod is typically directly aligned with a handle or, in some embodiments, comprises the handle itself. The piston rod and piston are moved longitudinally within the cylindrical body by moving the handle in a sliding action stroke relative to the body of the pump.

Manually operated bicycle pumps of the prior art generally fall into two classes, namely, hand-held pumps and floor pumps. Prior art hand-held pumps are operated by holding the body of the pump in one hand and pumping the piston via the piston rod and handle with the other hand in a sliding action stroke. The requisite sliding action stroke forces the user to pump by drawing both hands together (an "inward stroke") and apart (an "outward stroke") along a single axis. The user must essentially use one hand to anchor and stabilize the body of the pump while the other hand either presses the handle toward, or draws the handle away from, the body of the pump. Air is transferred to the receiving tube as the piston generates pressurized air within the cylinder.

Such a sliding action stroke along a single axis using both hands relies for effectiveness primarily on the arm and hand strength of the user. Moreover, the level of force which the user must exert increases as the pressure within the receiving tube increases. To reduce the force the user must exert at any one time as the pressure within the receiving tube increases, some pumps employ a smaller piston diameter. The smaller piston diameter reduces the force required to operate the pump, but correspondingly reduces the volume of air transferred per stroke. Thus, such pumps are less efficient per stroke.

Some manually operated pumps of the prior art attempt to compensate for this reduced volume of air transferred by utilizing a double stroke action. A double stroke action pump enables gas transfer (i.e. gas pressurization within the cylinder) when the piston moves in either direction within the cylinder. Thus, gas within the cylinder is pressurized when the user draws his or her hands together along a single axis (an "inward" stroke) as well as when the user draws his or her hands apart along the same axis (an "outward" stroke).

Such double stroke pumps of the prior art typically comprise two compression chambers: an outer compression chamber from which air is transferred on inward strokes and an inner compression chamber from which air is transferred on outward strokes (or vice versa). The outer compression chamber generally comprises a first cylinder, while the inner compression chamber generally comprises a second cylinder which lies nested within the first cylinder. The inner compression chamber of such pumps generally have a smaller maximum cross-sectional area than the outer compression chamber. Thus, a correspondingly smaller volume of gas can be transferred on the outward stroke relative to the inward stroke. The size of both compression chambers is further limited due to the desirability of minimizing the overall size of hand-held pumps.

A drawback of conventional double stroke action pumps is the complexity of the valve structure required to port air from the nested compression chambers. Such valve structure typically requires numerous mechanical check valves. Moreover, these pumps still require the user to use one hand to stabilize the body of the pump (i.e., the outer cylinder) while the other hand effects the sliding action stroke (i.e., together and apart) motion between the body of the pump and the handle.

Floor pumps of the prior art are designed such that the body of the pump (i.e. the cylinder) rests upon a relatively immobile surface such as the ground or floor. The weight of the pump itself as it rests upon the immobile surface, or the weight of the user's feet resting on the pump, serves to anchor the body of the pump. This obviates the need for the user to use one hand to stabilize or anchor the body of the pump. The user is thereby generally freed to use one or both hands to move the piston rod and attached piston (via the handle) in the cylinder.

In dynamic operation, floor pumps of the prior art draw air into the cylinder (i.e., the "chamber") as the handle is pulled axially away from the pump body (an "upward" stroke). Air in the chamber is compressed and transferred to the receiving tube as the handle is axially depressed toward the pump body (a "downward" stroke).

Prior art floor pumps take advantage of the user's body weight and a set of human musculature stronger than arms and hands to allow the user to exert greater force against the piston on the downward stroke than can be achieved with a hand-held pump. A greater available force to move the piston allows these pumps to be designed with a larger piston diameter which results in the delivery of greater volumes of air at a higher pressure to the receiving tube or tire.

Floor pumps of the prior art commonly use a single u-cup seal in combination with the piston to alternately seal and open the chamber on the downward and upward strokes, respectively. Such u-cup seals generally comprise a convex face and a concave face. Typically, the convex face of the u-cup seal abuts the piston, while the concave face of the u-cup seal faces the chamber. Generally, when held in a static position, an annular gap exists between the perimeter of the u-cup seal and the inner surface of the chamber.

In dynamic operation, as the air in the chamber is compressed on a downward stroke, the pressurized air is forced against the concave face of the u-cup seal causing the outer perimeter of the u-cup seal to flare open and lie flush against the inner surface of the chamber. The u-cup seal thereby substantially effects a seal and restricts the escape of air through the annular gap (i.e., the space between the outer perimeter of the piston and the inner surface of the chamber).

As the user draws the handle upward, a vacuum is created in the chamber. The vacuum draws air into the chamber through the annular gap. The force of the air entering the chamber presses against the convex face of the u-cup seal causing the u-cup seal to collapse thereby allowing the passage of air through the annular gap and into the chamber. Generally, the annular gap is sufficiently large to avoid back pressure problems as the air in the cylinder above the piston is compressed on the upward stroke.

A drawback of the prior floor pumps is that they are generally heavier and bulkier than most hand-held pumps. In contrast, a desirable feature of a bicycle pump is its ease of portability. In addition to being relatively light and compact, a popular, commercially available, manually operated bicycle pump is a hand-held pump designed to attach to the frame of a bicycle for ease of portability when not in use. However, all portable prior art pumps are designed to be detached from the bicycle frame when in use to inflate a tube or tire. This requires the user to detach the pump prior to use, then reattach or re-anchor the pump to the bicycle frame for subsequent transport.

The prior art fails to provide a hand operated bicycle pump which: (1) is portable on the frame of a bicycle and need not be detached from the bicycle frame when in use; (2) transfers substantially the same volume of air to the pneumatic tube or tire on both inward and outward strokes; (3) employs a double u-cup seal structure in the piston head assembly; (4) employs a flex valve structure to seal or open an air inlet port; or (5) anchors the body of the pump such that the user is free to use a more efficient set of human musculature to operate the pump.

SUMMARY OF THE INVENTION

The present invention relates to manually operated pumps, in particular, manually operated bicycle pumps. The present invention provides a manually operated bicycle pump which in its preferred embodiments: (1) is portable on the frame of a bicycle and preferably need not be detached from the bicycle frame when in use; (2) transfers substantially the same volume of air to the pneumatic tube or tire on both inward and outward strokes; (3) employs a more efficient double u-cup seal structure in the piston head assembly; (4) preferably employs a more efficient and easily manufacturable flex valve structure to seal or open an air inlet port; (5) preferably anchors the body of the pump such that the user is free to use a more efficient set of human musculature to operate the pump, and (6) may be more easily used than prior art pumps by those who are handicapped or have limited use of their hands.

The manual pump disclosed exhibits various advantages over pumps of the prior art. The present pump can remain anchored to a bicycle frame before, during and after the pumping operation. Anchoring the pump functions to stabilize the pump during the pumping cycle. Moreover, the disclosed pump allows a user to use only a single hand in performing the pivotal movement (or pumping action) which employs a more efficient set of human musculature. This combination of anchoring and pivotal movement allows the user to impart a greater compression force relative to prior art hand-held pumps.

Unlike the double stroke pumps of the prior art which require nested chambers, the novel dual u-cup seal piston head assembly permits two chambers to expand to a roughly equal size such that approximately the same amount of air is transferred to the receiving tube or tire during each stroke (i.e., first and second strokes) of a pumping cycle. In addition, the novel dual u-cup seal arrangement reduces the number of components required in the piston head assembly relative to double action stroke pumps of the prior art.

The preferred use of dual u-cup seals in the present piston head assembly also represents an advance over the prior art; in particular, over the prior use of o-rings. During dynamic operation of the pump of the present invention, the novel use of two u-cup seals in the piston head assembly reduces the amount of friction generated during a pumping cycle. Unlike the prior use of o-rings, each of u-cup seals only needs to contact the inner surface of the chamber during one stroke of the pumping cycle. In contrast, o-rings of the prior art require constant contact. During the alternate stroke of the pumping cycle the u-cup seal collapses as previously described to permit a greater volume of air to pass between the u-cup seal and the cylinder than if an o-ring were used.

The preferred use of a flex valve structure at a proximal end of the chamber also represents an advance over the prior art; in particular, over the prior use of check valves or flapper valves. The novel flex valve structure of the present invention functions to either permit or inhibit the flow of air into or out of the chamber. However, unlike the check valves or flapper valves used in prior art pumps, the flex valve of the present invention provides a more durable, reliable, and more easily manufacturable valve structure.

Thus, it is a primary object of the present invention to provide an improved bicycle pump.

It is also an object of the present invention to provide a bicycle pump which is portable on the frame of a bicycle.

It is another object of the present invention to provide a bicycle pump which need not be detached from the bicycle frame when in use.

it is an additional object of the present invention to provide a bicycle pump which transfers substantially the same volume of air to a pneumatic tube or tire on each stroke of a double stroke pumping action.

It is a further object of the present invention to provide a bicycle pump with an improved double u-cup seal piston head assembly.

It is yet an additional object of the present invention to employ a more efficient flex valve structure at one end of the cylinder.

it is another object of the present invention to provide a more ergonomically efficient bicycle pump design whereby the user is free to use a more efficient set of human musculature to operate the pump.

It is another object of the present invention to provide a bicycle pump design which may be used more easily by handicapped individuals or others whose use of both hands is impaired.

DETAILED DESCRIPTION OF THE PREFERRED EMBODIMENT

The manually operated pump in the particular embodiment described is designed for use as a bicycle pump. However, the principles described may be used for other types of pumps and in particular for other types of manually operated pumps.

Figure 1:
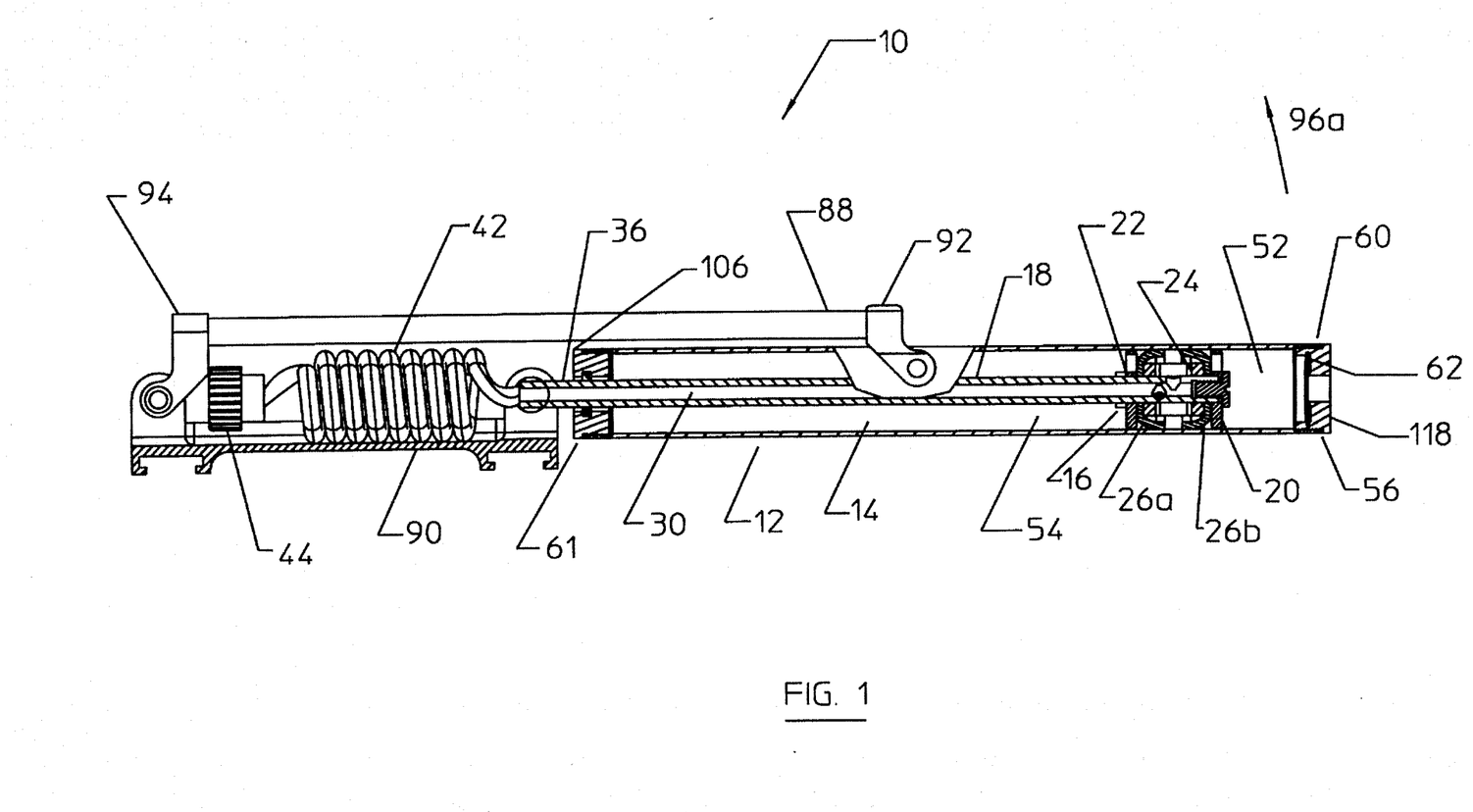
FIG. 1 is a cross-sectional view of a preferred embodiment of a hand operated bicycle pump of the present invention in a first position.

A particular preferred embodiment of the present invention comprising a manually operated pump 10 for inflating pneumatic tires or tubes or the like is shown in FIG. 1. As is shown in FIG. 1, the pump 10 preferably has an elongated cylindrical body 12 comprising an inner chamber 14 and a piston head assembly 16 positioned within the chamber 14. The chamber 14 preferably has a threaded proximal end 60 and a threaded distal end 61. Piston head assembly 16 is preferably connected to a tubular piston rod 18. The piston head assembly 16 and attached piston rod 18 are positioned within and adapted to slide longitudinally within the chamber 14.

Figure 2:
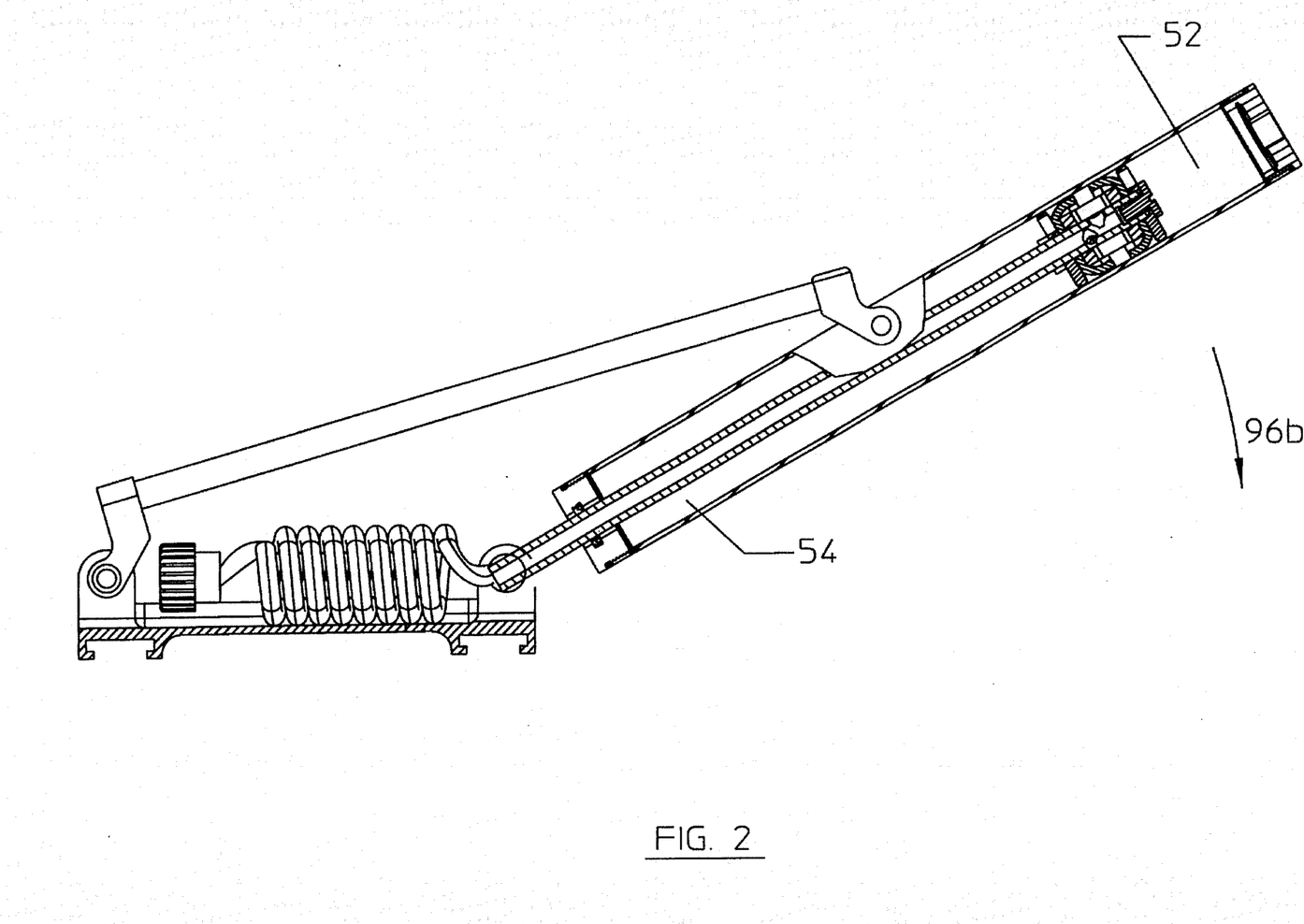
FIG. 2 is a cross-sectional view of a preferred embodiment of a hand operated bicycle pump of the present invention in a second position.
Figure 3:
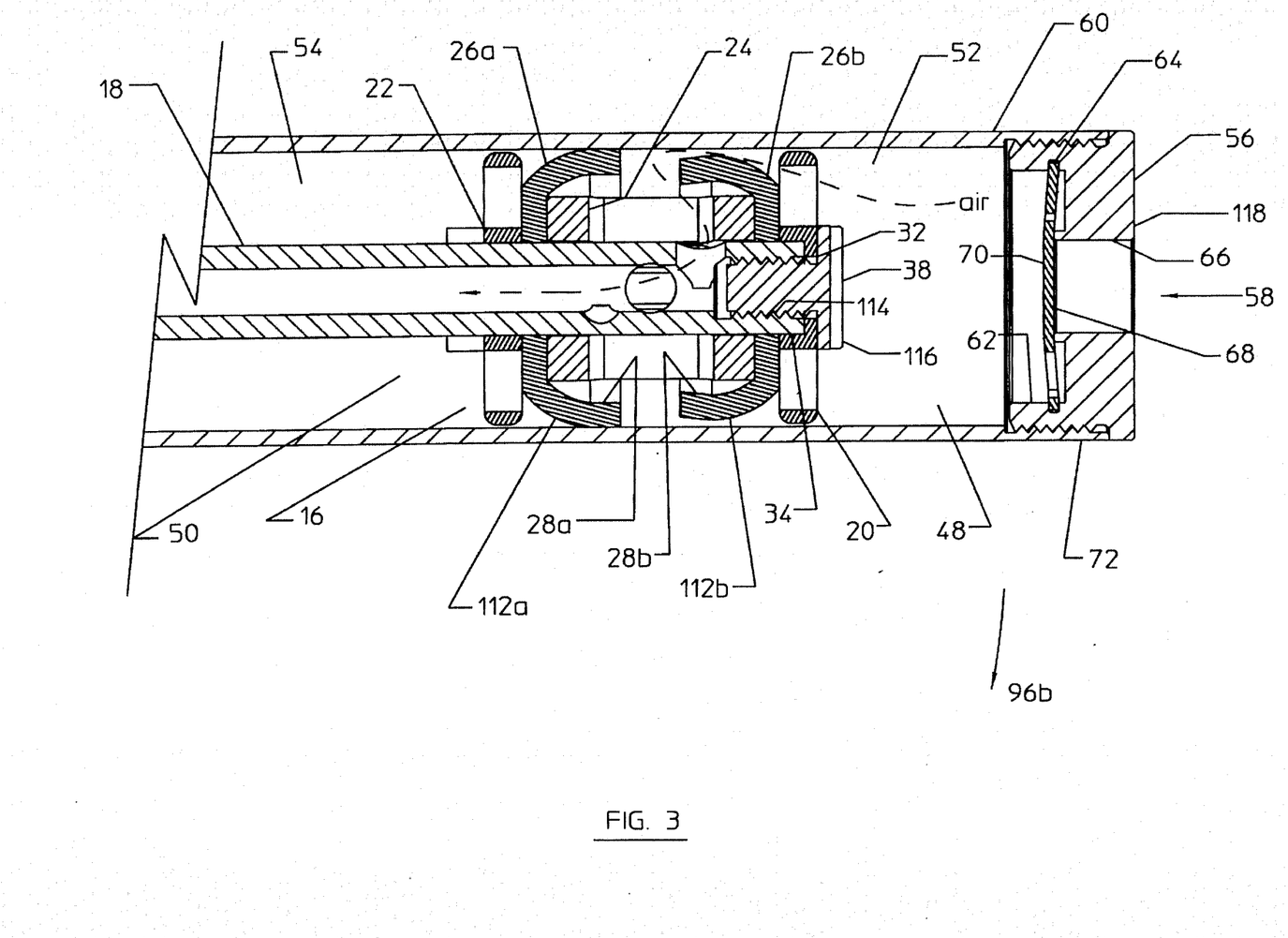
FIG. 3 is an exploded view of piston head assembly 16 in dynamic operation as proximal chamber 52 is compressed.

As is shown in FIGS. 1 through 4 and particularly FIGS. 1 and 3, the piston head assembly 16 preferably comprises a guide 20, a backing ring 22, a spacer 24, and a pair of u-cup seals 26a and 26b. These components of the piston head assembly 16 are preferably positioned near a proximal end 34 of the tubular piston rod 18 whereby the guide 20 is positioned nearest the proximal end 34 of the rod 18 followed by u-cup seal 26b, spacer 24, u-cup seal 26a, and backing ring 22. Thus, seal 26a is positioned between the backing ring 22 and spacer 24, while seal 26b is positioned between the guide 20 and the spacer 24.

As is shown in FIGS. 1 through 4 and particularly FIG. 3, seals 26a and 26b have convex faces 112a and 112b, as well as concave faces 28a and 28b. Concave faces 28a and 28b each preferably abut spacer 24 while convex face 112a preferably abuts backing ring 22 and convex face 112b preferably abuts guide 20. It is preferable that the guide 20 and the u-cup seals 26a and 26b have outer perimeters which fit within the chamber 14. The diameter of backing ring 22 need only be large enough to prevent the u-cup seal 26a from shifting position along the length of the piston rod 18. Therefore, the backing ring 22 ensures that the piston head assembly 16 does not shift its position toward a distal end 36 of the piston rod 18.

Figure 4:
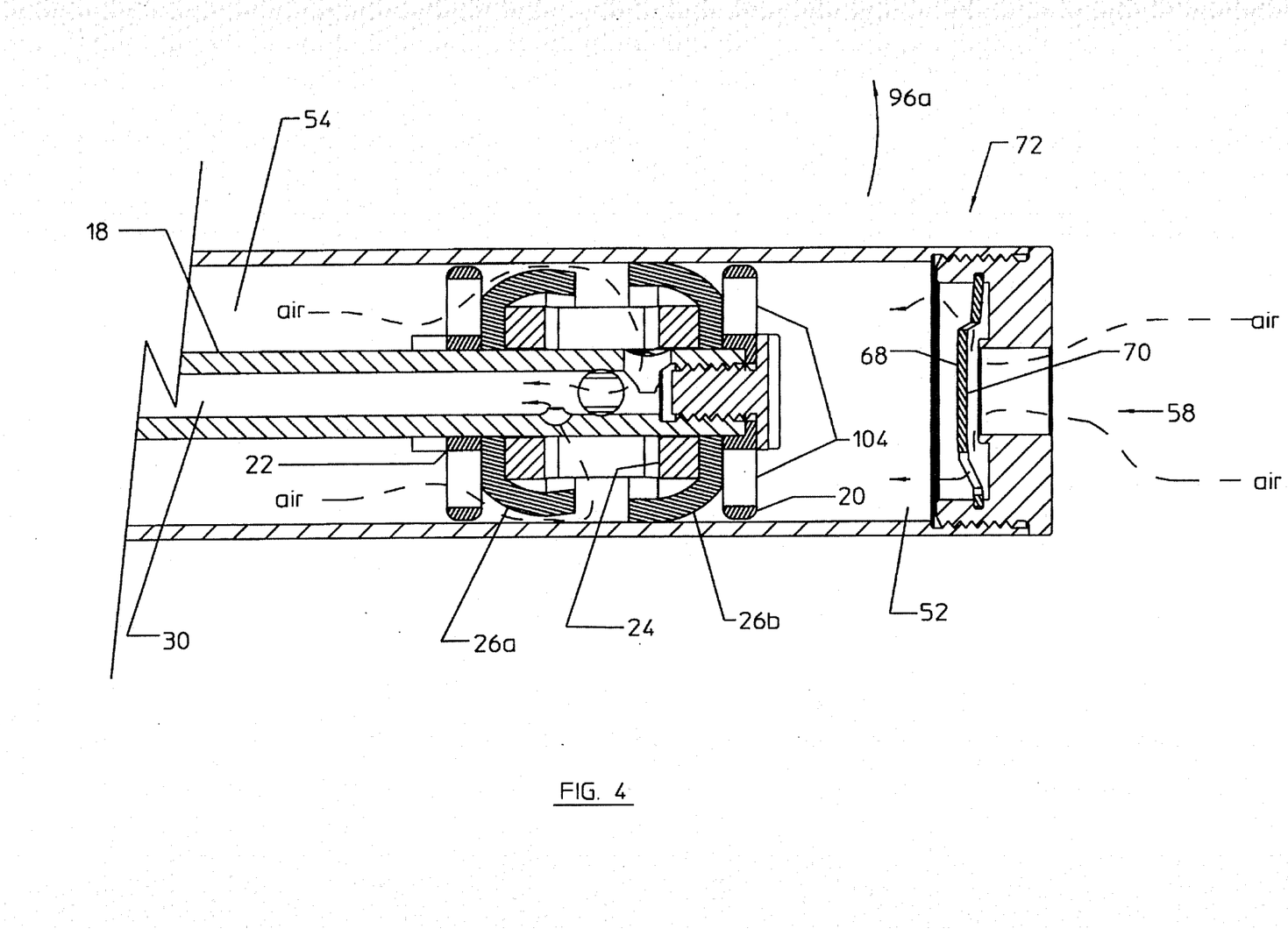
FIG. 4 is an exploded view of piston head assembly 16 in dynamic operation as distal chamber 54 is compressed.
Figure 6:
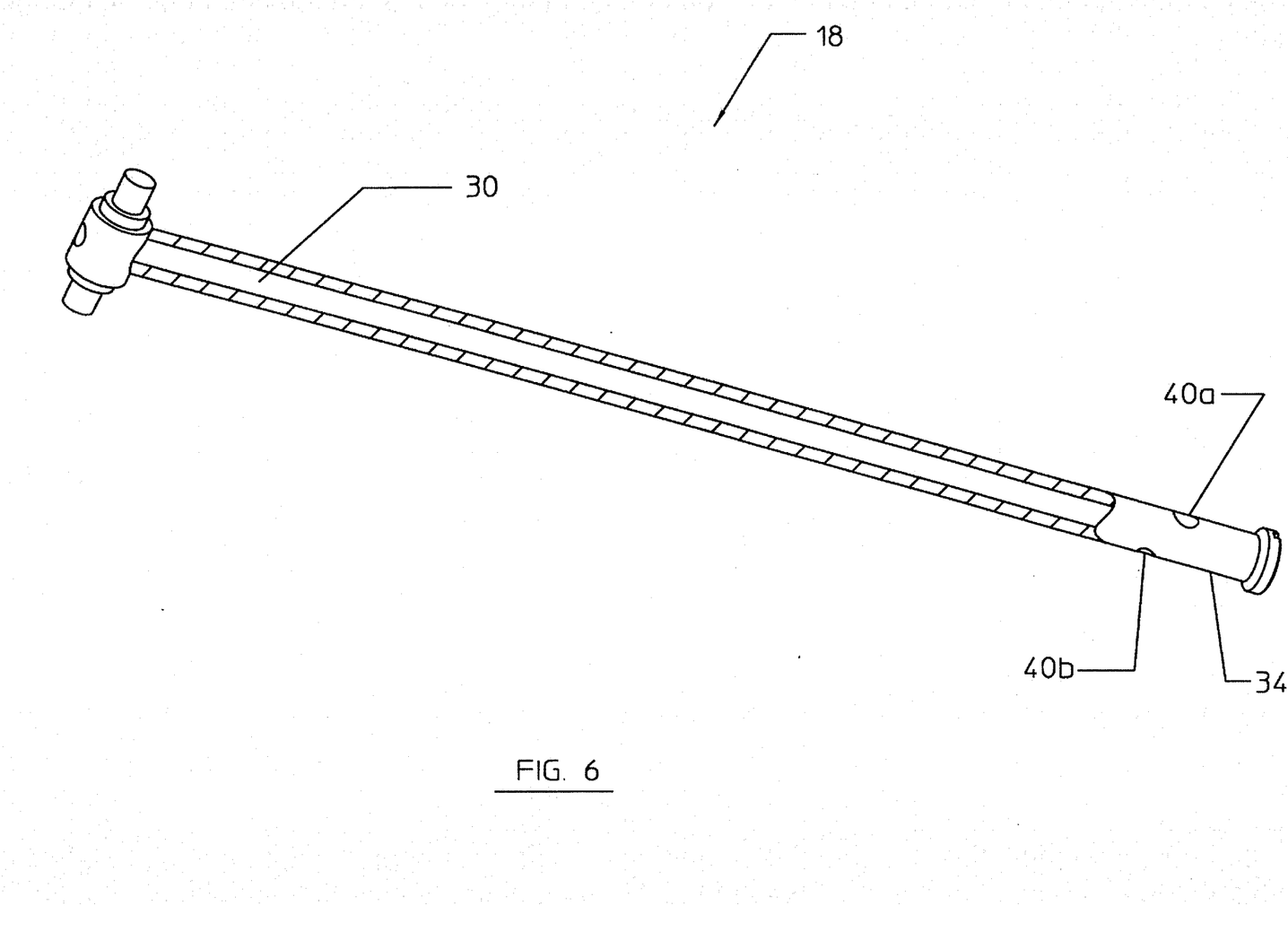
FIG. 6 is a perspective view of piston rod 18.

Tubular piston rod 18 defines a longitudinally-extending internal passage 30 as is shown in FIGS. 1, 4, and 6. The guide 20, backing ring 22, spacer 24 and seals 26a and 26b preferably each have an opening along a plane normal to the longitudinal axis of the chamber 14 through which the piston rod 18 extends. Piston rod 18 preferably has two ends, an internally threaded proximal end 34 to which the piston head assembly 16, described above, is attached, and a distal end 36 which extends from the chamber 14. A flexible hose 42, shown in FIG. 1, preferably connects the distal end 36 of piston rod 18 to a valve stem connector 44 to enable attachment to a bicycle tube or tire valve. The connection performed by connector 44 may be via any suitable coupling device, many of which are well known in the art.

The outer perimeter of guide 20 is preferably positioned in a sliding fit within the chamber 14. The piston head assembly 16, although slidably positioned in the inner chamber 14, separates the inner chamber 14 into a proximal chamber 52 and a distal chamber 54 as shown in FIGS. 1 and 2. The relative sizes of the proximal and distal chambers 52 and 54 vary depending on the position of the piston head assembly 16 relative to the cylindrical body 12.

As is shown in FIGS. 1 through 4 and particularly FIG. 3, guide 20 includes an inwardly-extending annular lip 32 which abuts the internally threaded proximal end 34 of piston rod 18. A screw 38 having threaded protrusions 114 and a head 116 is threaded to the internally threaded proximal end 34 of piston rod 18 such that the annular lip 32 of guide 20 is sandwiched between the proximal end 34 of the rod 18 and the head 116 of the screw 38. Thus, the screw 38 secures the guide 20 to the proximal end 34 of the rod 18.

Figure 5:
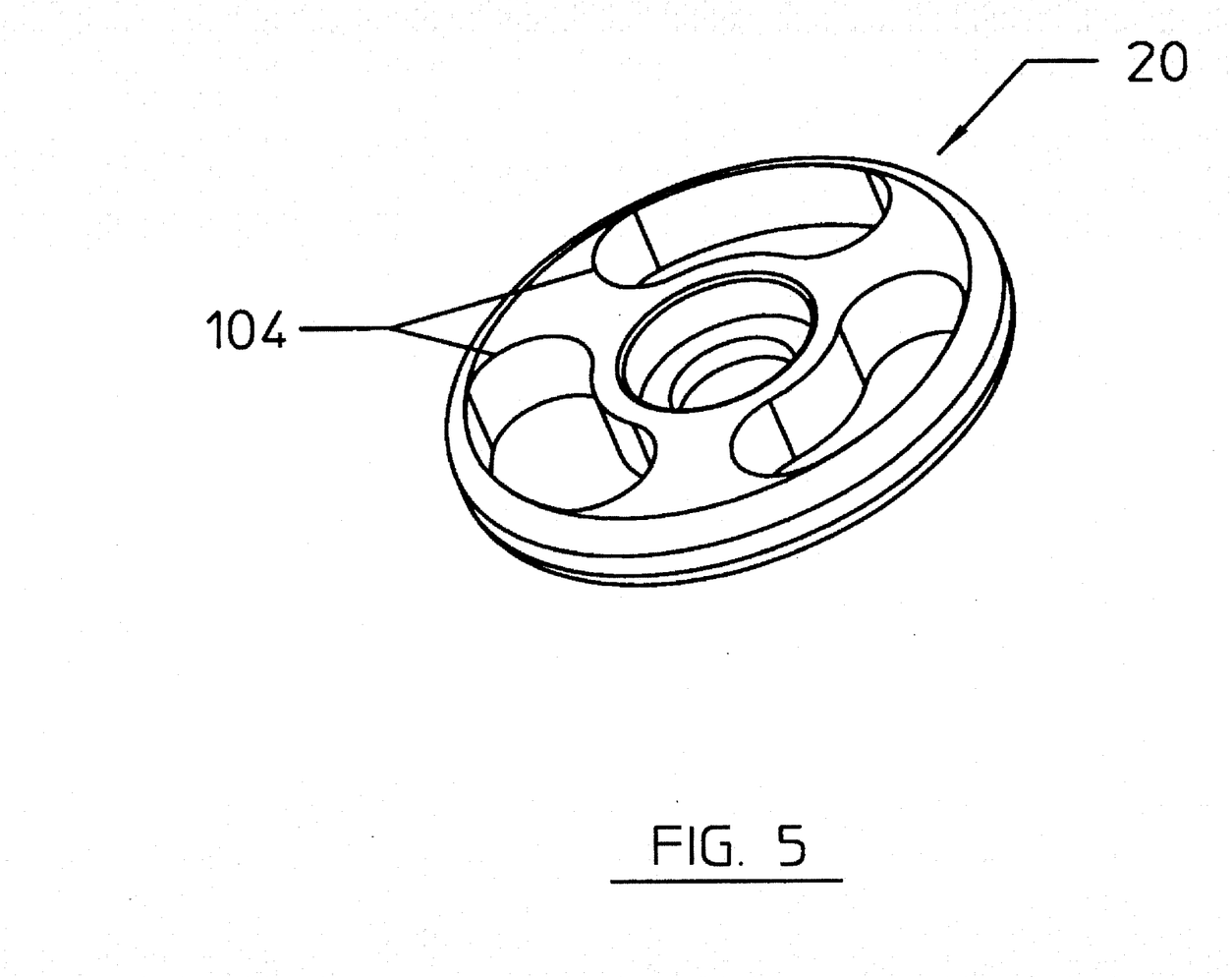
FIG. 5 is a plan view of guide means 20.

As is shown in FIG. 5, guide 20 includes openings 104 which permit air to pass through the guide 20, thereby minimizing back pressure problems. Pumps of the prior art generally leave an annular gap between the inner wall of the chamber and the perimeter of the piston for air to pass. However, the use of the openings 104 provides an alternate route for the air to pass. Thus, any gap between the guide 20 and the inner wall of chamber 14 can be minimized resulting in less play in the cylinder/piston system overall, and correspondingly less wearing of parts over the lifetime of the pump.

The openings 104 further take advantage of the flexible nature of u-cup seals 26a and 26b in that the flow of air passing through the openings 104 assists in bending the perimeter of a u-cup seal 26a or 26b away from the inner surface of chamber 14 depending on the direction in which piston head assembly 16 is sliding within the chamber 14.

Figure 7:
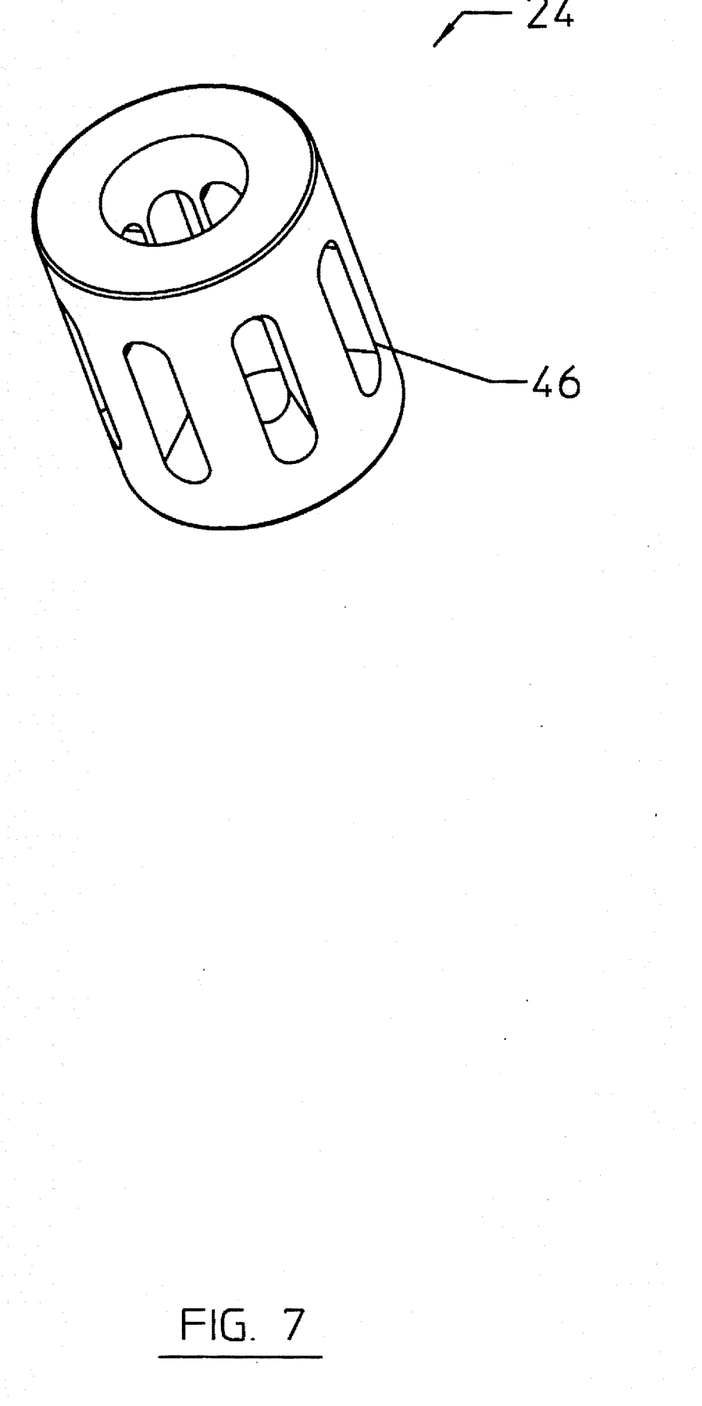
FIG. 7 is a perspective view of spacer 24.

As shown in FIG. 6, the proximal end 34 of piston rod 18, in the region which is preferably between seals 26a and 26b, has at least one opening which communicates with internal passage 30 of the rod 18. While a single opening would suffice, the piston rod 18 of the preferred embodiment includes two opposingly positioned openings 40a and 40b as shown in FIG. 6. As is shown in FIG. 7, spacer 24 includes one or more apertures 46 which are preferably substantially aligned with and communicate with openings 40a and 40b to thereby enable air to flow through the apertures 46 and openings 40a and 40b and into internal passage 30 of piston rod 18. A gas such as air can thereby pass freely through apertures 46, openings 40a and 40b, and consequently through internal passage 30 and flexible hose 42 to a receiving tube or tire.

As is described above and shown in FIGS. 1 through 4, piston head assembly 16 divides the chamber 14 into two separate chambers: proximal chamber 52 and distal chamber 54. One end 48 of piston head assembly 16 faces and defines the proximal chamber 52 and the opposite end 50 faces and defines the distal chamber 54. A proximal cap 56, shown in FIG. 1 near the proximal end 60 of the chamber 14, has a cap head 118 and an externally threaded axially extending cylindrical projection 62. The threaded cylindrical projection 62 engages the threaded proximal end 60 of the chamber 14 thereby securing the proximal cap 56 to the pump body 12. Proximal cap 56 is also provided with a cap opening 58, shown in FIGS. 3 and 4, for permitting air to flow therethrough and enter proximal chamber 52.

As shown in FIGS. 3 and 4, cap opening 58 is associated with a valve structure which permits air to be pulled through the opening 58 and into proximal chamber 52 as the piston head assembly 16 moves axially away from the proximal end 60 of the chamber 14. The valve structure also prevents air from escaping through the opening 58 when piston head assembly 16 moves axially toward the proximal end 60 of the chamber 14. The valve structure may comprise a suitable one-way valve which permits air to enter the proximal chamber 52 through the cap opening 58, but inhibits the air in the proximal chamber 52 from escaping through the cap opening 58. The preferred valve structure comprises valve assembly 72 as shown in FIGS. 3 and 4. The valve assembly 72 preferably comprises a flex valve 68 and a valve seat 66. The proximal cap 56 preferably includes an annular groove 64 and the valve seat 66, as shown in FIGS. 3 and 4, to enable engagement with the flex valve 68. The valve seat 66 preferably comprises a cylindrical projection which extends axially from the proximal cap 56 and which preferably defines the cap opening 58.

Figure 8:
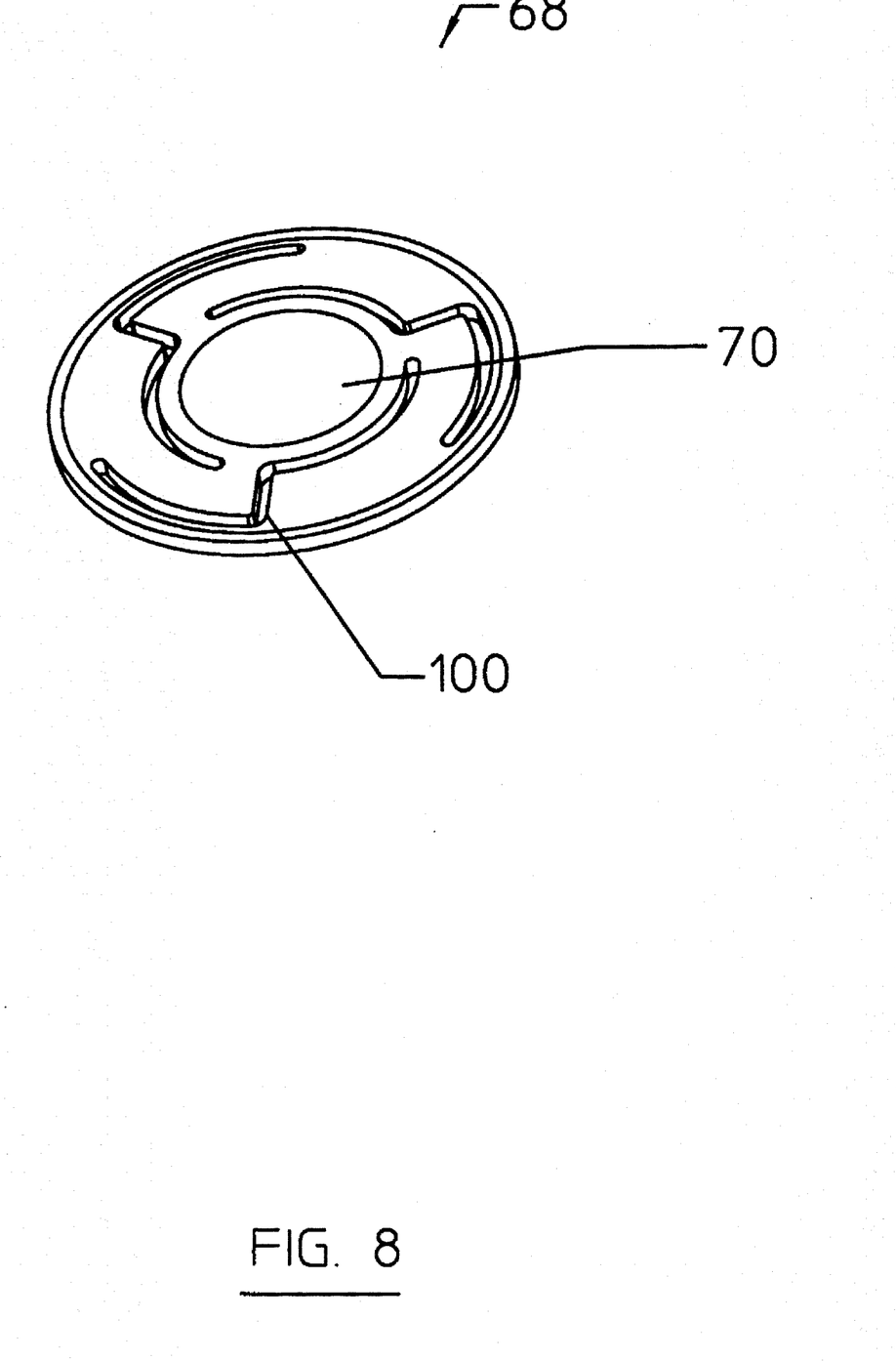
FIG. 8 is a plan view of flex valve 68.

The flex valve 68 is preferably positioned within annular groove 64 of the proximal cap 56 such that the flex valve 68 abuts the valve seat 66. Specifically, flex valve 68 preferably includes a sealing face 70 (shown in FIG. 8) which normally rests on the valve seat 66 of the proximal cap 56 as is shown in FIG. 3. The preferred flex valve 68 is made of a suitable elastic material such as plastic or rubber. Flex valve 68 also preferably includes cutouts 100 (shown in FIG. 8) which enable the pressure of air entering proximal chamber 52 through the cap opening 58 to flex the sealing face 70 away from valve seat 66 and thereby enable air to flow through the flex valve 68. However, when air attempts to escape the proximal chamber 52 through the cap opening 58, the compression force causes the sealing face 70 of the flex valve 68 to engage the valve seat 66 and thereby substantially seal the cap opening 58 preventing the escape of air. Specifically, when the pump 10 is in a resting state (or in dynamic operation as piston head assembly 16 moves axially toward proximal cap 56) sealing face 70 engages the valve seat 66 thereby sealing off the cap opening 58 and preventing air from escaping the proximal chamber 52. As piston head assembly 16 moves axially away from the proximal cap 56, air pressure causes sealing face 70 to extend away from the proximal cap 56. This extending away disengages valve seat 66 and thereby permits air to enter the proximal chamber 52 through the cap opening 58.

Alternate one-way valve structures well known in the art could be used in place of valve 72. For example, valve structures employing o-rings, ball & spring valves, or flapper valves could be used. However, such prior art valve structures generally require a greater number of components than the shown and described preferred valve 72. The preferred valve 72 allows air to enter the proximal chamber 52 as the proximal chamber 52 expands and minimizes leakage of air out the cap opening 58 when the air in proximal chamber 52 is compressed.

Figure 9:
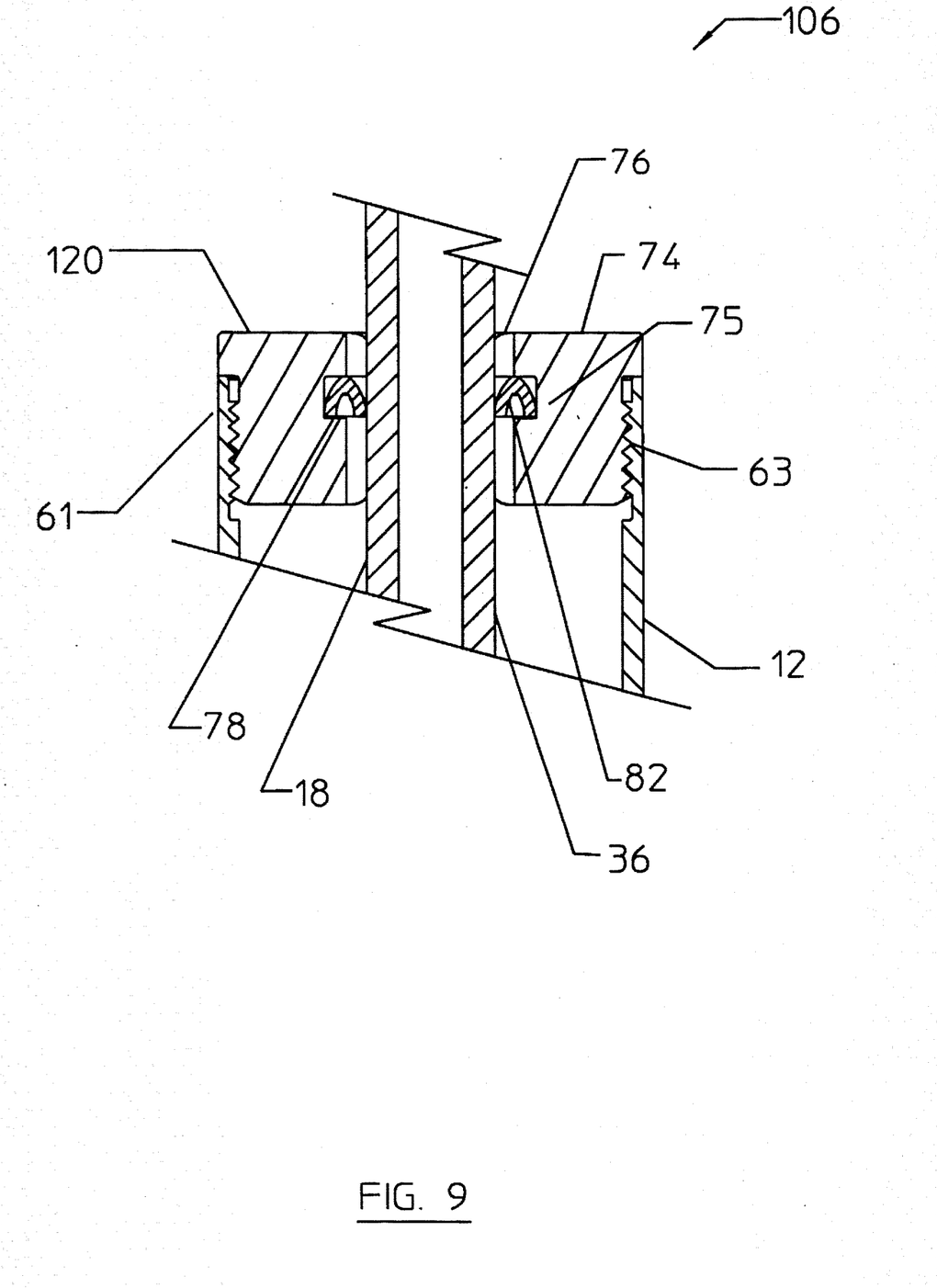
FIG. 9 is an enlarged cross-sectional view of the distal end of the cylindrical body 14.
Figure 10:
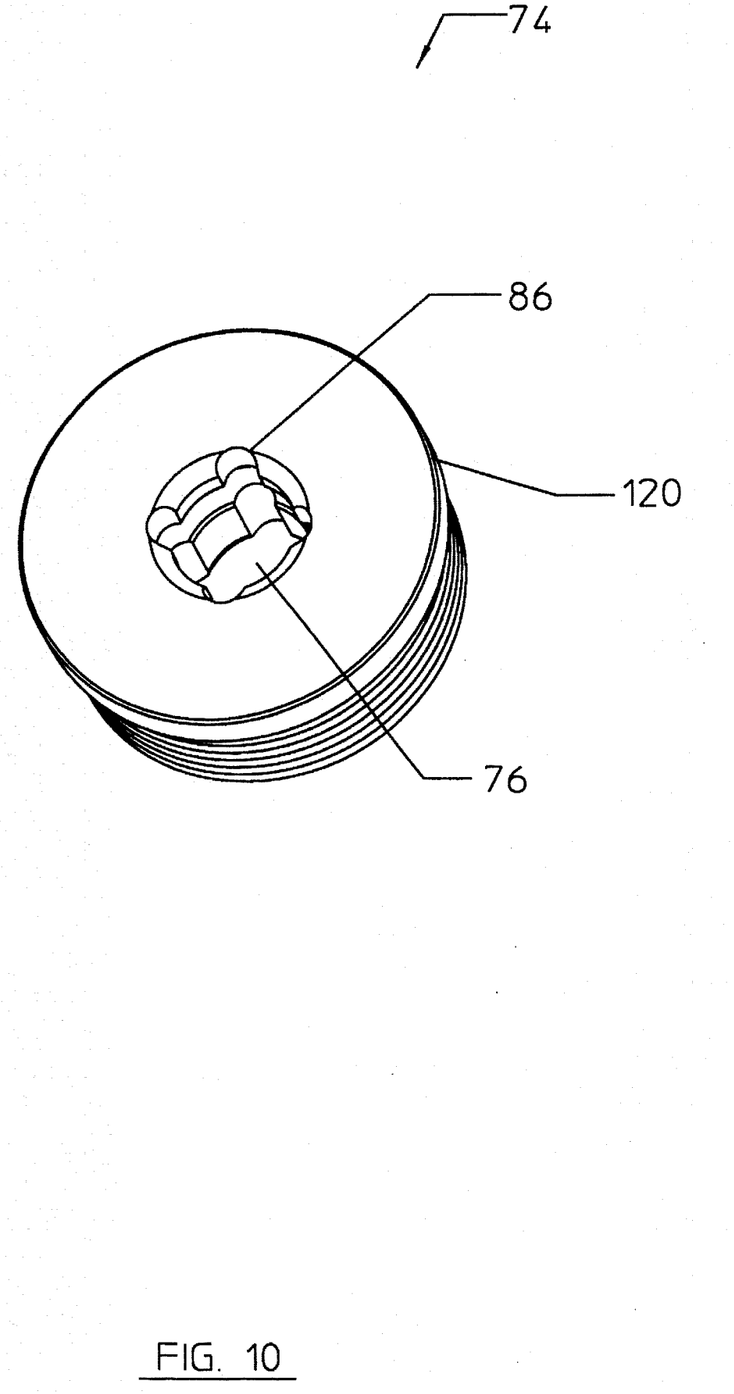
FIG. 10 is a plan view of distal cap 74.

The distal end 61 of chamber 14 preferably comprises distal valve 106 as shown in FIGS. 1 and 9. Distal valve 106 preferably includes a distal cap 74 which has a distal cap opening 76 through which the distal end 36 of piston rod 18 extends. As shown in FIG. 10, distal cap opening 76 preferably includes relief inlets 86 through which air can pass even when the piston rod 18 is positioned in the cap opening 76. Distal cap 74 further preferably includes a distal cap head 120 and an externally threaded axially extending cylindrical projection 63. The threaded cylindrical projection 63 of the distal cap 74 engages the threaded distal end 61 of chamber 14 thereby securing the distal cap 74 to the pump body 12. The cylindrical projection 63 preferably defines the distal cap opening 76 through which the distal end 36 of the tubular piston rod 18 extends.

As is shown in FIG. 9, distal cap 74 of distal valve 106 is also associated with a one-way valve structure 75. Although conventional one-way valves are suitable, the preferred valve structure is constructed using a mini-u-cup seal 80. The distal cap 74 has an annular groove 78 on the inner surface of cylindrical projection 63 which is adapted to receive the mini-u-cup seal 80. Mini-u-cup seal 80 engages the piston rod 18 which extends through the opening 76 defined by the cylindrical projection 63. The mini-u-cup seal 80 provides a substantial seal between the distal cap 74 and the piston rod 18. The u-cup seal 80 includes a concave face 82 which is positioned to face the piston head assembly 16 to thereby form a substantially flexible seal between the distal cap 74 and the piston rod 18 to enable the piston rod 18 to move through the distal cap opening 76 yet to prevent substantial air loss therethrough.

As shown in FIGS. 1 and 2, the preferred pump 10 also includes a linkage 88 and an attachment bracket 90. The linkage 88 preferably comprises two ends, a first end 92 is pivotally attached to the pump body 12 and a second end 94 is pivotally attached to the bracket 90. The bracket 90 is also pivotally attached to the distal end 36 of piston rod 18. Therefore, the pump 10 preferably includes three pivotal connections: (1) the connection between the pump body 12 and the linkage 88; (2) the connection between the linkage 88 and the bracket 90; and (3) the connection between the bracket 90 and the distal end 36 of piston rod 18.

Bracket 90 may be attachable to a bicycle frame (not shown) by any suitable means well known in the art. Bracket 90 itself can be replaced by any other suitable means well known in the art for pivotally attaching the end 94 of linkage 88 and the distal end 36 of piston rod 18 to the bicycle frame.

Turning to the method of use in detail, comparing FIGS. 1 and 2, in dynamic operation of pump 12, the user will typically connect valve stem connector 44 to the valve stem of a bicycle tube or tire. Thereafter, the user by grasping the pump body 12 (near the proximal end 60 of the chamber 14) will cause pivotal movement of the body 12 relative to the bracket 90 about the distal end 36 of piston rod 18 in the direction of arrows 96a and 96b. In this pivotal movement, proximal and distal chambers 52 and 54 are alternately compressed and expanded. When either of the chambers 52 or 54 is expanded, a gas such as air is admitted to the chamber 52 or 54 in a manner hereafter described. When the chambers 52 or 54 are alternately compressed, the air in the chamber (52 or 54) being compressed is forced through the apertures 46 of the spacer 24, openings 40a and 40b of piston rod 18, internal passage 30, flexible hose 42 and valve stem connector 44 and into the receiving tube or tire.

The specific operation of the pump is best understood with reference to FIGS. 1 and 2 focusing on a first stroke and a second stroke of a pumping cycle. During a typical first stroke of a pumping cycle, the pump body 12 is pivoted upward in the direction of arrow 96a. As the pump body 12 is pivoted upward, the piston head assembly 16 moves toward the distal end 61 of the chamber 14 and distal chamber 54 is compressed while proximal chamber 52 is expanded. As distal chamber 54 is compressed, the air within distal chamber 54 presses against the concave face 82 of mini-u-cup seal 80 tending to flatten the concave face 82. The outer perimeter of mini-u-cup seal 80 is forced against the inner surface of annular groove 78, while the inner perimeter of mini-u-cup seal 80 is forced against piston rod 18. In this position, u-cup seal 80 substantially seals the distal chamber 54 such that air is substantially prevented from escaping distal chamber 54 through distal cap opening 76.

The compressed air from distal chamber 54 forces the u-cup seal 26a to collapse and bend away from the inner surface of chamber 14 thereby forming an annular gap through which the air may pass to the spacer 24. The compressed air forces the concave face 28b of u-cup seal 26b to flare open and press against the inner surface of chamber 14 such that air is substantially prevented from passing to proximal chamber 52. The compressed air must therefore pass through the apertures 46 of the spacer 24, openings 40a and 40b and internal passage 30 of piston rod 18, flexible hose 42, and valve stem connector 44, and ultimately into the receiving tube or tire.

As is mentioned above, as the distal chamber 54 compresses, the proximal chamber 52 expands. As the proximal chamber 52 expands, a vacuum is created in proximal chamber 52 which pulls air into the proximal chamber 52 via valve 72. The force of the air entering proximal chamber 52 causes the sealing face 70 of flex valve 68 to extend axially away from valve seat 66, thereby allowing air to enter the proximal chamber 52 through cap opening 58. The expansion and filling of proximal chamber 52 is occurring simultaneously with the compression and emptying of distal chamber 54. This completes a first stroke of a pumping cycle.

When compression of the air within distal chamber 54 has been completed, proximal chamber 52 has been expanded to allow a maximum volume of air to enter the proximal chamber 52. To complete the second stroke of the pumping cycle, the user now pivots the pump body 12 downward in the direction of arrow 96b. As the pump body 12 is pivoted downward, the piston head assembly 16 moves towards the proximal end 60 of the chamber 14 and the proximal chamber 52 is compressed while the distal chamber 54 is expanded. As proximal chamber 52 is compressed, the air within proximal chamber 52 presses the sealing face 70 of the flex valve 68 against the valve seat 66. In this position, sealing face 70 substantially seals the chamber 14 such that air is substantially prevented from escaping proximal chamber 52 through cap opening 58.

The compressed air from proximal chamber 52 forces the u-cup seal 26b to collapse and bend away from the inner surface of the chamber 14 thereby forming an annular gap through which the air may pass to the spacer 24. The compressed air forces the concave face 26a of u-cup seal 26a to flare open and press against the inner surface of chamber 14 such that air is substantially prevented from passing to distal chamber 54. The compressed air, therefore, is forced to pass through the apertures 46 of the spacer 24, openings 40a and 40b and internal passage 30 of the piston rod 18, flexible hose 42, and valve stem connector 44, and ultimately into the receiving tube or tire.

As the air in chamber 52 is compressed, chamber 54 is expanded. As chamber 54 expands, a vacuum is created which pulls air primarily through relief inlets 86 and into the chamber 54 via distal valve 106. The force of the air entering through the relief inlets 86 causes the outer perimeter of mini-u-cup seal 80 to bend away from the surface of the rod 18, thereby allowing air to fill the distal chamber 54. The expansion and filling of the distal chamber 54 is occurring simultaneously with the compression and emptying of proximal chamber 52. This completes a second stroke of a pumping cycle.

When compression of the air within proximal chamber 52 has been completed, distal chamber 54 has been expanded to allow a maximum volume of air to enter the distal chamber 54. The pumping cycle may continue by repeating the first stroke, then the second stroke, and so on. The process described of alternately compressing and expanding proximal and distal chambers 52 and 54 can continue until the appropriate pressure level within the receiving tube or tire has been reached.

SUMMARY

The manual pump 10 disclosed exhibits various advantages over pumps of the prior art. By means of the preferred bracket 90, the pump 10 can remain anchored to a bicycle frame before, during and after the pumping operation. Anchoring the pump 10 (e.g. via bracket 90) functions to stabilize the pump 10 during the pumping cycle. Moreover, the disclosed pump 10 allows a user to use only a single hand in performing the pivotal movement which employs a more efficient set of human musculature. This combination of anchoring and pivotal movement allows the user to impart a greater compression force relative to prior art hand-held pumps.

The preferred novel piston head assembly permits proximal and distal chambers 52 and 54 to expand to a roughly equal size such that, unlike the double stroke pumps of the prior art, approximately the same amount of air is transferred to the receiving tube or tire during each stroke of the pumping cycle. Thus, an improved double action stroke pump is disclosed. In addition, a double action stroke pump is disclosed which reduces the number of components required in the piston head assembly relative to double action stroke pumps of the prior art.

The preferred use of dual u-cup seals 26a and 26b in the piston head assembly 16 also represents an advance over the prior art; in particular, the prior use of O-rings. During dynamic operation of the pump 10, the novel use of two u-cup seals in the piston head assembly 16 reduces the amount of friction generated during a pumping cycle. Unlike the prior use of o-rings, each of u-cup seals 26a and 26b only contacts the inner surface of the chamber 14 during one stroke of the pumping cycle. During the alternate stroke of the pumping cycle the u-cup seal collapses as previously described to permit a greater volume of air to pass between the u-cup seal and the cylinder than if an o-ring were used.

The use of preferred flex valve 68 in valve structure 71 also represents an advance over the prior art; in particular, over the prior use of check valves or flapper valves. The flex valve 68 of the present invention functions to either permit or inhibit the flow of air into or out of the cylinder. However, unlike the check valves or flapper valves used in prior art pumps, flex valve 68 of the present invention provides a more durable, reliable, and more easily manufacturable valve structure.

Thus, a highly novel and efficient design for a new type of manually operated pump has been described. Clearly, many modifications and variations of the present invention are possible in light of the above teachings. For example, the invention described could include a pressure gauge at some convenient point (e.g. along the flexible hose 42) to permit the user to gauge the pressure within the receiving tube or tire. Therefore, it is to be understood that, within the scope of the appended claims, the principles of the present invention may be realized in embodiments other than the one specifically described above.

I claim:
1. A bicycle pump comprising
    a pump body forming a substantially cylindrical chamber having an inner surface and having at least one inlet to enable one-way gaseous communication between internal and external the pump body, the inlet comprising a flex valve seat and a flex valve comprising a sealing face and a plurality of flex arms defining a plurality of apertures therebetween, the flex valve seat and flex valve cooperating to substantially seal the chamber by gas pressure pressing the sealing face against the flex valve seat when gas pressure proximate the inlet is higher internal to the pump body than gas pressure proximate the inlet external to the pump body, the flex valve seat and flex valve further cooperating to enable the introduction of gas into the chamber by gas pressure pressing the sealing face away from the flex valve seat causing the flex arms to extend thereby opening the apertures there between and allowing gas to pass there through when gas pressure proximate the inlet is higher external to the pump body than gas pressure proximate the inlet internal to the pump body, a substantially tubular piston rod forming an internal passage, the piston rod having a first end positioned in the chamber of the pump body and the piston rod having at least one opening proximal the first end to enable gaseous communication between the internal passage and the chamber of the pump body, the piston rod further having a second end connectable to a transmission hose to enable gaseous communication between the internal passage and the transmission hose, and a piston head assembly attached to the piston rod proximal the first end and positioned in the chamber of the pump body, the piston head assembly comprising a pair of flexible u-cup seals each comprising a concave face and each attached to the piston rod proximal the first end with the at least one opening of the piston rod therebetween and with the concave faces facing together, the u-cups seals being sized such that their perimeters slidably fit within the chamber of the pump body and being flexible to enable gas pressure within the chamber to deform the seals to allow gas to pass between at least one of the seals and the inner surface and to substantially prevent gas from passing between at least one of the seals and the inner surface.

2. The bicycle pump of claim 1 wherein the pump body is pivotally attached to a linkage, the linkage is pivotally attached to a bracket which is attachable to a bicycle frame, and the bracket is pivotally attached to the piston rod of the pump body, and wherein pivotal manipulation of the pump body causes the linkage and piston rod to pivot on the bracket and causes the piston head assembly of the piston rod to slide within the chamber of the pump body.

3. A method of using a pump comprising a pump body forming a substantially cylindrical chamber having an inner surface and having at least one inlet to enable one-way gaseous communication between internal and external the pump body, the inlet comprising a flex valve seat and a flex valve comprising a sealing face and a plurality of flex arms defining a plurality of apertures therebetween, the flex valve seat and flex valve cooperating to substantially seal the chamber by gas pressure pressing the sealing face against the flex valve seat when gas pressure proximate the inlet is higher internal to the pump body than gas pressure proximate the inlet external to the pump body, the flex valve seal and flex valve further cooperating to enable the introduction of gas into the chamber by gas pressure pressing the sealing face away from the flex valve seat causing the flex arms to extend thereby opening the apertures there between and allowing gas to pass there through when gas pressure proximate the inlet is higher external to the pump body than gas pressure proximate the inlet internal to the pump body, a substantially tubular piston rod forming an internal passage, the piston rod having a first end positioned in the chamber of the pump body and the piston rod having at least one opening proximal the first end to enable gaseous communication between the internal passage and the chamber of the pump body, the piston rod further having a second end connectable to a transmission hose to enable gaseous communication between the internal passage and the transmission hose, and a piston head assembly attached to the piston rod proximal the first end and positioned in the chamber of the pump body, the piston head assembly comprising a pair of flexible u-cup seals each comprising a concave face and each attached to the piston rod proximal the first end with the at least one opening of the piston rod therebetween and with the concave faces facing together, the u-cups seals being sized such that their perimeters slidably fit within the chamber of the pump body and being flexible to enable gas pressure within the chamber to deform the seals to allow gas to pass between at least one of the seals and the inner surface and to substantially prevent gas from passing between at least one of the seals and the inner surface, wherein the pump body is pivotally attached to a linkage, the linkage is pivotally attached to a bracket which is attachable to a bicycle frame, and the bracket is pivotally attached to the piston rod of the pump body, and wherein pivotal manipulation of the pump body causes the linkage and piston rod to pivot on the bracket and causes the piston head assembly of the piston rod to slide within the chamber of the pump body, comprising the steps of (a) connecting the transmission hose to an item to be inflated, (b) pivoting the pump body in a first direction comprising a first stroke which causes the linkage and piston rod to pivot on the bracket and causes the piston head assembly of the piston rod to slide within the chamber of the pump body thereby forcing gas from the chamber through the internal passage of the piston rod and the transmission hose to the item to be inflated, (c) pivoting the pump body in a second direction comprising a second stroke which causes the linkage and piston rod to pivot on the bracket and causes the piston head assembly of the piston rod to slide within the chamber of the pump body thereby forcing gas from the chamber through the internal passage of the piston rod and the transmission hose to the item to be inflated, and (d) repeating steps (b) and (c) until the desired gas pressure is attained within the item to be inflated.

\* \* \* \* \*